Dec. 30, 1924.

J. JUNKUNC

SPARE TIRE LOCK

Filed Nov. 30, 1923

1,520,902

Inventor
John Junkunc
by Charles W. Hills
Attys

Patented Dec. 30, 1924.

1,520,902

UNITED STATES PATENT OFFICE.

JOHN JUNKUNC, OF CHICAGO, ILLINOIS.

SPARE-TIRE LOCK.

Application filed November 30, 1923. Serial No. 677,855.

*To all whom it may concern:*

Be it known that I, JOHN JUNKUNC, a citizen of the United States, and a resident of the city of Chicago, in the county of Cook and State of Illinois, have invented certain new and useful Improvements in a Spare-Tire Lock; and I hereby declare that the following is a full, clear, and exact description of the same, reference being had to the accompanying drawings, and to the numerals of reference marked thereon, which form a part of this specification.

This invention relates to a spare tire lock and particularly to a locking device which is adapted to prevent the unauthorized removal of spare tires and rims from automotive vehicles by locking the same in association with the chassis or some fixed member of the vehicle.

It is desirable that such locking means be convenient to use, difficult to destroy or unlock, and practical considerations require that it be possible to manufacture the same at small cost.

It is an important object therefore, of the present invention, to provide a spare tire lock satisfactorily complying with such requirements.

It is also an important object of this invention to provide a spare tire lock wherein a locking member is engaged in locking position between the strands of a retaining cable.

Another important object of the invention resides in the provision of an improved means for attaching the retaining means to the locking block.

Other and further important objects of this invention will be apparent from the descriptions in the specification and the accompanying drawings.

The invention (in a preferred form) is shown on the drawings and hereinafter more fully described.

Figure 1:
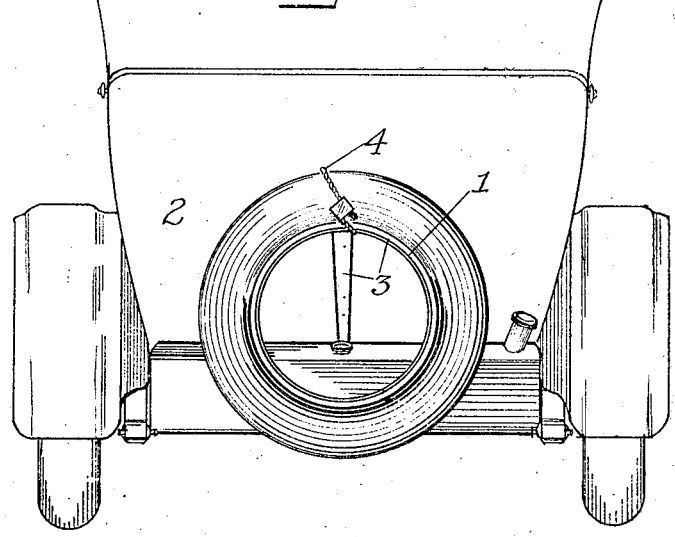
Figure 1 is a rear elevation of an automotive vehicle with the spare tire lock of this invention in position thereon.

The locking means of this invention is adapted to be used for securing a spare tire and rim 1 in association with a permanent part of a vehicle 2 such as an automobile. In the present instance, I have shown said spare tire and rim mounted on a usual tire carrier structure 3 and said tire carrier structure is of course secured in permanent association with the vehicle frame by means of rivets passing therethrough or any other suitable manner. Spare tire and rim 1 is secured in position on the carrier 3 by means of a flexible retaining means 4 which is engaged around the spare tire and rim and the carrier and locked in such position. As clearly shown in Figure 1 said flexible retaining means 4 comprises a stranded wire cable the outside of which is preferably hardened to resist cutting by usual tools, and one end of said retaining means 4 is permanently secured in a recess formed in a locking block 5. The end of the retaining means 4 is secured in the recess by the engagement of a transverse pin 7 which is driven through the end of the retaining means 4, said pin 7 being of such diameter as to make a driving fit with a hole drilled laterally in the block 5 and traversing the recess. It will thus be apparent that when the pin 7 is once driven into the hole it cannot be readily removed therefrom without entirely destroying the locking block 5.

Figure 2:
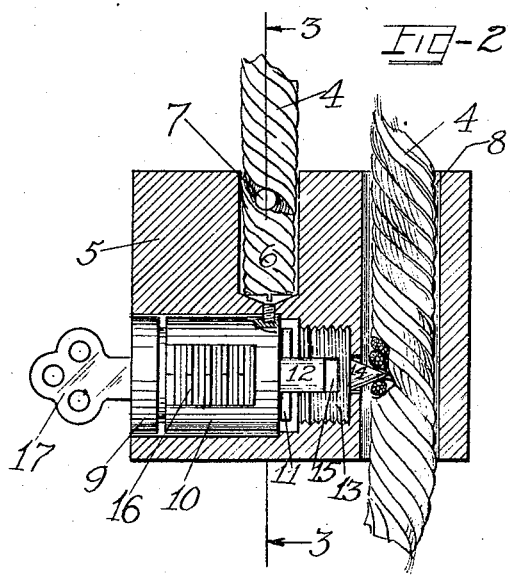
Figure 2 is an enlarged fragmentary section with parts in elevation through the locking block on the line 2—2 of Figure 3.
Figure 3:
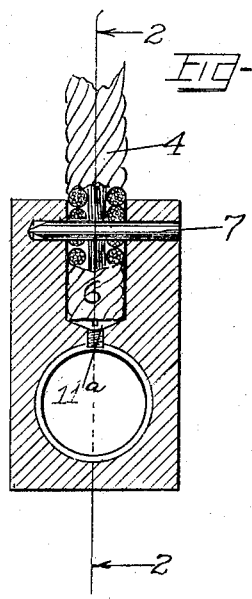
Figure 3 is a fragmentary section with parts omitted on the line 3—3 of Figure 2.

The free end of the retaining means 4 is provided with a suitable cap and is adapted to be passed through a passage 8 formed in the block 5 near one edge thereof and parallel to the recess in which the end of the retaining member is secured. Means are provided for locking the free end of the flexible retaining means 4 in association with the locking block 5 after the same has been engaged around the tire and rim 1 and the tire carrier 3 and through the passage 8; said means which are clearly shown in Figure 2 comprising a locking cylinder 9 which is rotatably mounted in a sleeve 10 secured in a recess formed in the locking block at right angles to the passage 8, said sleeve being permanently secured in said recess by means of a set-screw 11ª extending into a threaded opening in the sleeve through an aperture formed in the block in the bottom of the recess in which the fixed end of the flexible retaining means is mounted. It will be apparent from this construction that when the set-screw 11ª is inserted into the sleeve 10 in the position shown in Figures 2 and 3 and the end of the retaining means subsequently permanently secured to the block, access to the set-screw 11ª and removal thereof and of the sleeve 10, is effectively prevented.

Withdrawal of the locking cylinder 9 from the sleeve 10 is prevented by pin 11 which is engaged transversely through a tongue 12 which is integral with and projects from the inner end of said locking cylinder.

The inner end of the recess in which the sleeve 10 is mounted is reduced in diameter and threaded, and mounted in said threaded portion is a rotatable threaded member 13 which is provided with an integral pointed locking prong 14 adapted to be engaged through a reduced opening in the block 5 communicating with the passage 8 so that the pointed end thereof may be engaged between the strands of the retaining means 4 to lock the same in position relative to the passage 8. The rotation of the threaded member 13, when the lock cylinder 9 is rotated, is effected through the engagement of the tongue 12 in a mortise 15 formed in said threaded member.

The locking cylinder 9 is of any well known construction and the lock tumblers 16 are so arranged that rotation of said cylinder relative to the sleeve 10 is only possible when a proper key 17 is inserted in a usual key slot extending axially through the locking cylinder.

The locking block 5 is preferably constructed of hardened steel or some other material which resists destruction and it will be apparent that when the prong 14 is moved into locking engagement between the strands of the retaining means 4 and the key withdrawn, said retaining means will be permanently locked in association with said locking block. The device is of course unlocked by inserting the key and rotating the cylinder 9 and the threaded member 13 in a reverse direction, whereupon the prong 14 is withdrawn from engagement between the strands and the free end of the retaining means 4 may be removed from the passage 8 to permit removal of the tire and rim 1 from the carrier 3.

It will be apparent from the foregoing description that this invention provides a spare tire lock of simple and durable construction and one which may be economically manufactured. The fixed end of the retaining means is of course permanently secured in position relative to the locking block by the pin 7 and when secured in such permanent position prevents access to the set-screw 11ª and unauthorized removal of the sleeve 10 and the locking cylinder 9.

I am aware that numerous details of construction may be varied through a wide range without departing from the principles of my invention and I therefore do not purpose limiting the patent granted hereon otherwise than necessitated by the prior art.

I claim as my invention:

1. A device of the class described, comprising a stranded retaining means, a locking block having one end of the retaining means permanently secured thereto and having a passage adapted to receive the other end of the retaining means, and locking means in the block adapted to be forced into engagement with the retaining means between the strands thereof.

2. A device of the class described, comprising a stranded retaining means, a locking block having one end of the retaining means permanently secured thereto and having a passage adapted to receive the other end of the retaining means, and locking means in the block adapted to be rotated therein into engagement with the retaining means between the strands thereof.

3. In a device of the class described, a member having a plurality of recesses therein and a passage therethrough, a flexible retaining member, a locking member in one of the recesses adapted to engage a portion of the retaining member in the passage, means insertable from the bottom of another recess for securing the locking member, and means for permanently securing one end of the flexible member in the last mentioned recess outside the locking member securing means.

In testimony whereof I have hereunto subscribed my name in the presence of two subscribing witnesses.

JOHN JUNKUNC.

Witnesses:
CARLTON HILL,
OSCAR HARTMANN.